(12) United States Patent
Ye et al.

(10) Patent No.: US 11,103,832 B2
(45) Date of Patent: Aug. 31, 2021

(54) THREE DIMENSIONAL NANOPOROUS MEMBRANE HAVING MULTIPLE INDEPENDENT, CONTINUOUS PORE SYSTEMS

(71) Applicant: Lawrence Livermore National Security, LLC, Livermore, CA (US)

(72) Inventors: Jianchao Ye, Livermore, CA (US); Andreas C. Baumgaertel, Berkeley, CA (US); Juergen Biener, San Leandro, CA (US); Monika M. Biener, San Leandro, CA (US); Sangil Kim, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1224 days.

(21) Appl. No.: 15/136,801

(22) Filed: Apr. 22, 2016

(65) Prior Publication Data
US 2017/0304778 A1    Oct. 26, 2017

(51) Int. Cl.
*B01D 67/00*    (2006.01)
*B01D 53/22*    (2006.01)
*B01D 71/02*    (2006.01)
*H01M 50/403*    (2021.01)
*H01M 50/463*    (2021.01)

(52) U.S. Cl.
CPC ....... *B01D 67/0072* (2013.01); *B01D 53/228* (2013.01); *B01D 67/0067* (2013.01); *B01D 71/022* (2013.01); *B01D 2323/225* (2013.01); *B01D 2325/021* (2013.01); *H01M 50/403* (2021.01); *H01M 50/463* (2021.01)

(58) Field of Classification Search
CPC ........ A61F 2/82; B01J 19/00; B01D 67/0053; B01D 61/027; B01D 67/0072
USPC ................ 631/1.15, 1.42; 427/2.21; 632/901
See application file for complete search history.

(56) References Cited

U.S. PATENT DOCUMENTS

2006/0276878 A1* 12/2006 Owens ...................... A61F 2/07
                                                              623/1.15

OTHER PUBLICATIONS

Engineering on-chip nanoporous gold material libraries via precision photothermal treatment; Chapman et al., Nanoscale, 2015, 8, 785-795 (Year: 2015).*
Chapman, C. A. R. et al., "Engineering on-chip nanoporous gold material libraries via precision photothermal treatment," Nanoscale, The Royal Society of Chemistry, vol. 8, No. 2, Jan. 2016, pp. 785-795.
Stark, A. M., "Researchers for the gold on a single chip," Jan. 20, 2016, pp. 1-5.

* cited by examiner

*Primary Examiner* — Monique R Peets
(74) *Attorney, Agent, or Firm* — Zilka-Kotab, P.C.

(57) ABSTRACT

According to one embodiment, a composition of matter includes: a first system of continuous voids arranged in a three-dimensional matrix; a second system of continuous voids arranged in the three-dimensional matrix; and a nanoporous barrier separating the first system of continuous voids and the second system of continuous voids. The first system of continuous voids and the second system of continuous voids are interwoven but independent so as to form a plurality of channels through the three-dimensional matrix. Corresponding methods for forming the composition of matter are also disclosed.

20 Claims, 13 Drawing Sheets

THREE DIMENSIONAL NANOPOROUS MEMBRANE HAVING MULTIPLE INDEPENDENT, CONTINUOUS PORE SYSTEMS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The presently disclosed inventive concepts relate to nanoporous membranes, and more particularly to three dimensional nanoporous membrane structures characterized by two or more interwoven, continuous, independent pore systems, and methods of making the same.

BACKGROUND

In the field of micro- and nano-scale membranes, which are useful in the context of separation and purification, catalysis, energy storage, and other applications, conventional structures follow a paradigm in which the membrane structure is formed as a thin film or ultra-thin film.

While these conventional film-based structures are capable of considerable separation of target materials from other materials (e.g. solute from solvent, mixtures of gases, etc.) the separation capacity is a function of the surface area of the film-based structure. Since the film-based structure has no appreciable thickness (i.e. nanometer scale thickness, e.g. approximately 30 nm), a substantially two-dimensional structure has a surface area which is essentially the area of the membrane. This structural configuration is thus limiting on the desirable characteristics of a membrane, particularly permeability and selectivity.

Accordingly, it would be highly beneficial to provide techniques for synthesizing novel structures offering superior permeability and selectivity relative to existing, e.g. thin-film based porous membrane structures.

SUMMARY

In one embodiment, a composition of matter includes: a first system of continuous voids arranged in a three-dimensional matrix; a second system of continuous voids arranged in the three-dimensional matrix; and a nanoporous barrier separating the first system of continuous voids and the second system of continuous voids. The first system of continuous voids and the second system of continuous voids are interwoven but independent so as to form a plurality of channels through the three-dimensional matrix.

In another embodiment, a method is for forming a three-dimensional nanoporous separation membrane having at least two continuous, independent pore systems. The method includes: dealloying an alloy to form a matrix of ligaments interspersed with a first system of continuous voids; sealing at least one end of the matrix; forming a conformal layer of a material on surfaces of the ligaments exposed to the first system of continuous voids; and unsealing the matrix to form the three-dimensional nanoporous separation membrane having at least two continuous, independent pore systems.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

FIG. 4A is a cross-sectional schematic view of a matrix comprising ligaments and voids, according to one embodiment.

FIG. 4B is a cross-sectional schematic view of a matrix comprising ligaments and voids, the bicontinuous matrix being sealed along one end, according to one embodiment.

FIG. 4C is a cross-sectional schematic view of a matrix comprising ligaments and voids, the ligaments having formed thereon a conformal nanoporous layer of a material, and the bicontinuous matrix being sealed along one end, according to one embodiment.

FIG. 4D is a cross-sectional schematic view of a three-dimensional nanoporous membrane having two independent, bicontinuous pore systems separated by the conformal nanoporous layer of the material formed in FIG. 4C, according to one embodiment.

FIG. 5A is a cross-sectional schematic view of a matrix comprising ligaments and voids, according to one embodiment.

FIG. 5B is a cross-sectional schematic view of a matrix comprising ligaments and voids, the ligaments having formed thereon a conformal nanoporous layer of a material, according to one embodiment.

FIG. 5C is a cross-sectional schematic view of a matrix comprising ligaments and voids, the ligaments having formed thereon a conformal nanoporous layer of a material, and the voids of the bicontinuous matrix being sealed along one end, according to one embodiment.

FIG. 5D is a cross-sectional schematic view of a matrix comprising ligaments and voids, the ligaments having formed thereon a conformal nanoporous layer of a material, the voids of the bicontinuous matrix being sealed along one end of the matrix and terminal portions of the ligaments being exposed along the one end of the matrix, according to one embodiment.

FIG. 5E is a cross-sectional schematic view of a three-dimensional nanoporous membrane having two independent, bicontinuous pore systems separated by the conformal nanoporous layer of the material formed in FIG. 5B, according to one embodiment.

DETAILED DESCRIPTION

Figure 1A:
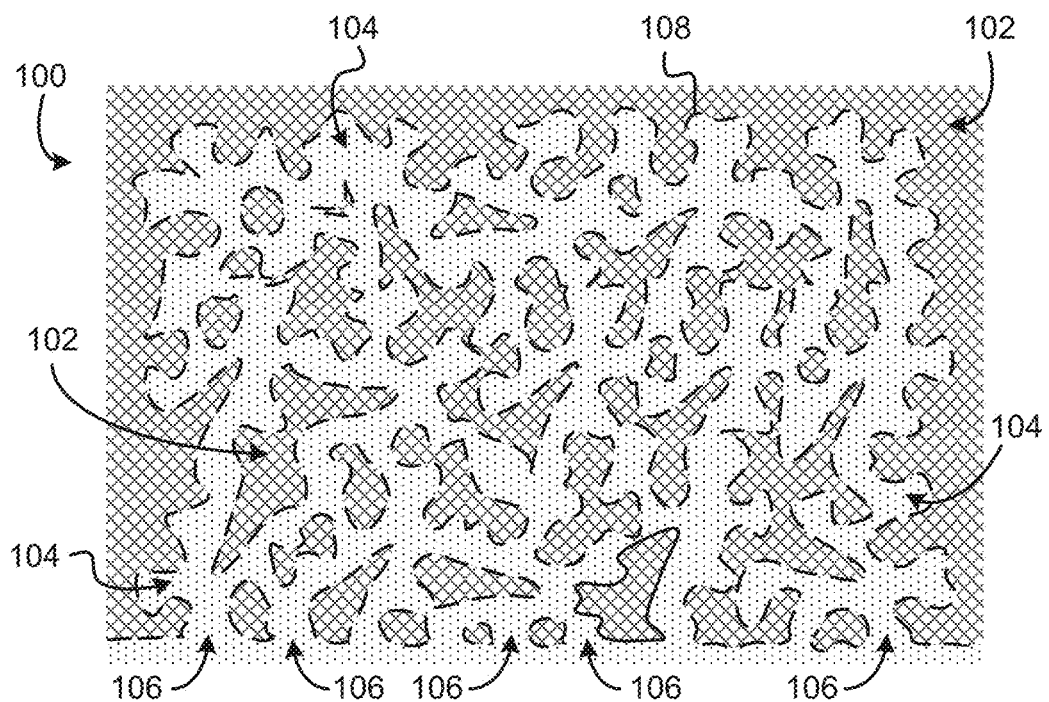
FIG. 1A is a simplified cross-sectional schematic view of a three-dimensional nanoporous membrane having two independent, bicontinuous pore systems, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

As also used herein, the term "about" when combined with a value refers to plus and minus 10% of the reference value. For example, a length of about 1 µm refers to a length of 1 µm±0.1 µm.

It must also be noted that, as used in the specification and the appended claims, the singular forms "a," "an" and "the" include plural referents unless otherwise specified.

The following description discloses several preferred embodiments of three dimensional vertically structured transistors and/or related systems and methods of making the same.

In one general embodiment, a composition of matter includes: a first system of continuous voids arranged in a three-dimensional matrix; a second system of continuous voids arranged in the three-dimensional matrix; and a nanoporous barrier separating the first system of continuous voids and the second system of continuous voids. The first system of continuous voids and the second system of continuous voids are interwoven but independent so as to form a plurality of channels through the three-dimensional matrix.

In another general embodiment, a method is for forming a three-dimensional nanoporous separation membrane having at least two continuous, independent pore systems. The method includes: dealloying an alloy to form a matrix of ligaments interspersed with a first system of continuous voids; sealing at least one end of the matrix; forming a conformal layer of a material on surfaces of the ligaments exposed to the first system of continuous voids; and unsealing the matrix to form the three-dimensional nanoporous separation membrane having at least two continuous, independent pore systems.

As discussed previously, conventional membrane structures are generally characterized by an ultra thin-film configuration, in which the surface area of the membrane is dictated nearly exclusively by the area of the membrane, the porosity of the film-based structure, and the size/arrangement of pores within the film.

However, some of the most efficient membrane structures presently known are characterized by an extremely high surface area, accomplished via employing a three dimensional structure with complex systems of interwoven structures such as ligaments and voids/channels therebetween. For instance, structures in the lungs, kidneys, intestinal villi, etc. all employ this general theme to accomplish complex three-dimensional matrices capable of vastly superior separation capability relative to a thin-film structure, even a thin film structure substantially representing a cross-sectional portion of the exemplary three-dimensional matrices listed above.

Without wishing to be bound to any particular theory, it is contemplated that three-dimensional matrices such as exemplified above accomplish superior separation capability due to the relatively high surface area afforded by three-dimensional geometries, at least in part because the number of exchange sites of a three-dimensional structure may vastly exceed that of a corresponding two-dimensional cross section of the three-dimensional structure.

However, conventional approaches to membrane design and synthesis have yet to accomplish this desirable improvement to separation characteristics, particularly by formulating a three-dimensional structure characterized by two or more continuous, independent pore systems interwoven in a matrix with high surface area sufficient to convey desired permeability and selectivity along with sufficient mechanical strength to withstand pressure gradients associated with separation.

Accordingly, developing such a separation system with improved and desirable separation characteristics would yield a highly useful and novel separation system.

Referring now to FIG. 1A, a simplified cross-sectional schematic view of a three-dimensional nanoporous membrane 100 having two independent, bicontinuous pore systems is shown, according to one embodiment.

The three-dimensional nanoporous membrane 100 is characterized by two independent, bicontinuous pore systems. These pore systems comprise a first system of continuous voids 102 (cross-hatched regions) and a second system of continuous voids 104 (stippled regions) where the materials defining the respective voids in each system are arranged in a three-dimensional matrix to form the monolithic structure of the three-dimensional nanoporous membrane 100. Preferably, the bicontinuous pore systems are interwoven throughout the three-dimensional matrix, and interfaces between each pore system are defined by a nanoporous barrier 108.

Figure 1B:
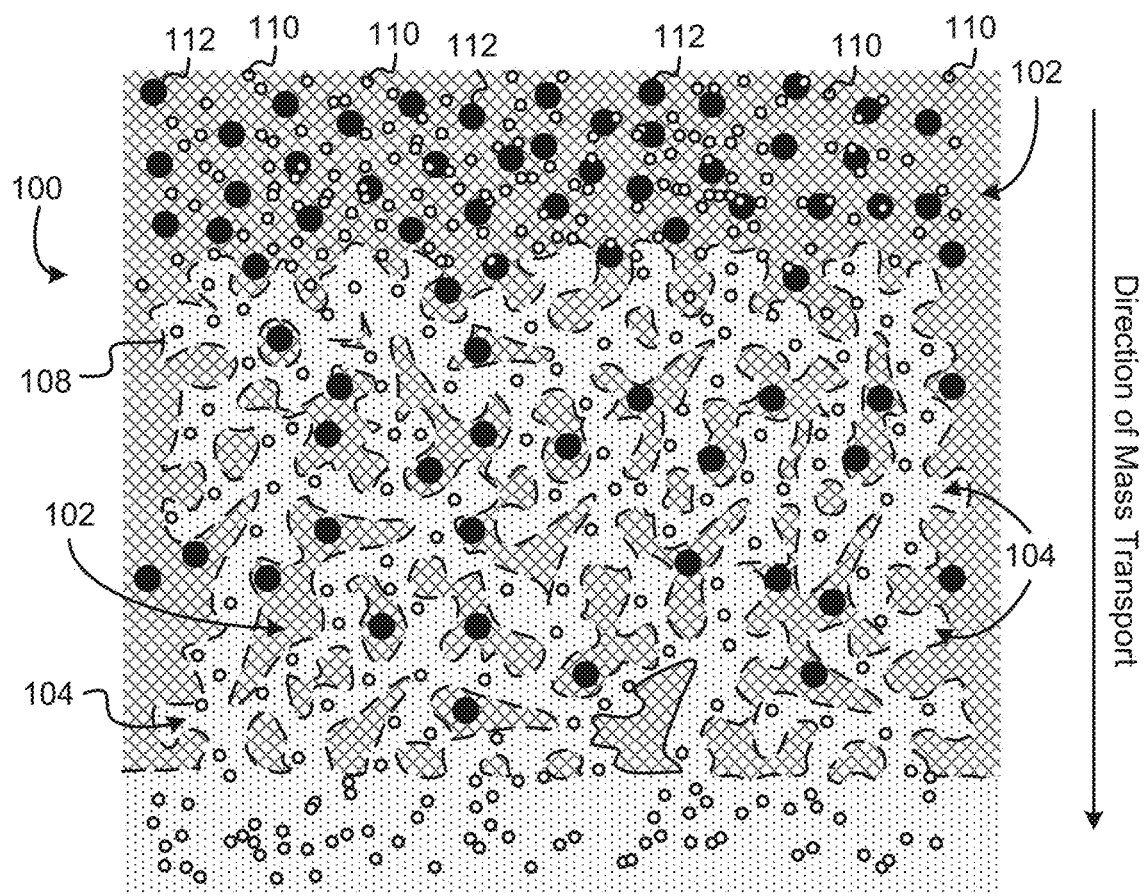
FIG. 1B is a simplified cross-sectional schematic view of a three-dimensional nanoporous membrane having two independent, bicontinuous pore systems exhibiting separation/purification activity according to one embodiment.

Furthermore, the three-dimensional nanoporous membrane 100 is optimally characterized by a first end of the three-dimensional nanoporous membrane 100 being accessible via the first system of continuous voids 102, such that material being introduced to the three-dimensional nanoporous membrane 100 enters the membrane environment via the first system of continuous voids 102 (e.g. from the "top" as shown in FIGS. 1A-1B). In one embodiment, the first end of the three-dimensional nanoporous membrane 100 comprises a substantially open orifice providing ingress to the first system of continuous voids 102 and selectively providing ingress to the second system of continuous voids 104.

Conversely, the three-dimensional nanoporous membrane 100 is optimally characterized by a second end opposite the first end, the second end being accessible via the second system of continuous voids 104. Even more preferably, to facilitate mass transport from the first end to the second end, at the second end the second system of continuous voids 104 is preferably characterized by including a plurality of macropores 106 providing egress from the three-dimensional nanoporous membrane 100.

As referred to herein, a pore system (or equivalently, system of voids) is considered continuous when the pore system is characterized by a structure having one or more continuous channels configured to facilitate mass transport throughout the three-dimensional nanoporous membrane 100.

Similarly, pore systems are considered independent when the systems are characterized, in combination, by the respective channels thereof being continuous without relying on transition from one pore system to another in order to accomplish mass transport throughout the three-dimensional nanoporous membrane 100.

Preferably, and as shown in FIG. 1B, the pore systems of the presently disclosed inventive embodiments are independent and bicontinuous while also being selectively permeable to a compound or compounds of interest, such that the three-dimensional nanoporous membrane 100 serves as a membrane selectively permeable to the compound or compounds of interest while also providing a high degree of flux across the membrane.

For instance, in one embodiment experiments comparing a conventional two-dimensional porous membrane with a three-dimensional nanoporous membrane 100 characterized by two independent, bicontinuous pore systems as disclosed herein revealed the three-dimensional nanoporous membrane 100 having two independent, bicontinuous pore systems exhibits a flux of at least approximately two orders of magnitude greater than the conventional two-dimensional porous membrane structure.

Selective permeability may be conveyed via selective affinity to the compound or compounds of interest, selective affinity against the compound or compounds of interest, via size exclusion, etc. according to various embodiments and as would be understood by a person having ordinary skill in the art upon reading the present descriptions.

For example, and with reference to the exemplary embodiment depicted in FIG. 1B, a three-dimensional nanoporous membrane 100 having two independent, bicontinuous pore systems 102, 104 may be configured to purify a target species 110 from a non-target species 112 on the basis of size exclusion. As shown, the nanoporous barrier 108 has pores (indicated by breaks in the barrier 108) characterized by a diameter in a range from about 0.3 nm to about 10 nm 0.3 nm to about 7 nm, 0.3 nm to about 5 nm, or any suitable range based on, e.g. the diameter of target species 110 and/or non-target species 112. For instance, the pore diameter may be determined so as to permit passage/permanence of the target species 110 by tuning the pore diameter to be slightly larger than a diameter of target species 110, and/or may be determined so as to deny, passage permeance of the non-target species 112 by tuning the pore diameter to be slightly less than a diameter of the non-target species 112, in alternative approaches.

The barrier 108 may have a thickness in a range from about 0.5 nm to about 10 nm, in various approaches, and be based in whole or in part on an expected pressure gradient across the nanoporous membrane 100. Advantageously, the nanometer-scale thickness of the presently disclosed inventive embodiments facilitate permeance of target species 110 via an extremely short exchange pathway, coupled with a high number of exchange sites due to the high surface area of the three-dimensional nanoporous membrane 100.

Again, as the cross-sectional view shown in FIGS. 1A-1B is merely a two-dimensional slice of the overall three-dimensional nanoporous membrane 100, it should be understood that the first system of voids 102 is continuous and portions appearing to be isolated in the view shown in FIGS. 1A-1B are interconnected via other portions of the first system of voids 102 not shown specifically in FIGS. 1A-1B.

Returning to the separation action achieved by three-dimensional nanoporous membrane 100, in operation and according to one embodiment a solution, mixture, etc. of species 110 and 112 may be introduced to the three-dimensional nanoporous membrane 100 via a first end of a system including the three-dimensional nanoporous membrane 100. Any suitable system may be employed, and as shown in FIG. 1B the solution, mixture, etc. are introduced from the top of the system and mass transport occurs in the direction indicated by the arrow.

In the size-exclusion embodiment, target species 110 may transition from the first system of voids 102 into the second system of voids 104 via any of the pores in the barrier 108, as the pores are configured to have a diameter sufficient to allow ingress of the target species 110 into the second system of voids 104. However, non-target species 112 is prevented from transitioning into the second system of voids 104 and thus is retained within the first system of voids 102 as mass transport occurs. Since the three-dimensional nanoporous membrane 100 is configured to allow egress therefrom only via the second system of voids 104, e.g. via macropores 106 as shown in FIG. 1A, the non-target species 112 is prevented from transitioning across the three-dimensional nanoporous membrane 100.

In a proof-of-principle experiment, and according to one embodiment the foregoing concepts were demonstrated in to effectively filter dye (direct blue 71, non-target species 112) from water (target species 110), with 100% rejection of the dye and high permeance of water. Accordingly, the presently disclosed inventive concepts may be characterized, in various embodiments, by a 100% selectivity rate with respect to the appropriate species.

Of course, other exclusionary principles or techniques that would be considered suitable by a person having ordinary skill in the art upon reading these descriptions may additionally and/or alternatively be employed without departing from the scope of the present disclosures. For instance, charge- or affinity-based separation principles may be leveraged by functionalizing one or more surfaces of the barrier 108 with species configured to selectively attract, bind, etc. the target or non-target species 110, 112.

For example, in various embodiments one or more chemical handles may be functionalized on the surface(s) of barrier 108, and active species may be attached thereto in order to selectively attract, bind, etc. the target or non-target species 110, 112. Suitable active species may include charged species such as proton acceptors, proton donors, Lewis acids, antibodies, antigens, enzymes, etc. as would be understood by a person having ordinary skill in the art upon reading the present descriptions. In several exemplary embodiments, active species may include one or more of amine functional groups, ammonia functional groups, carboxyl groups, hydroxyl groups, metal ions (e.g. to bind peptides), etc.

Figure 2A:
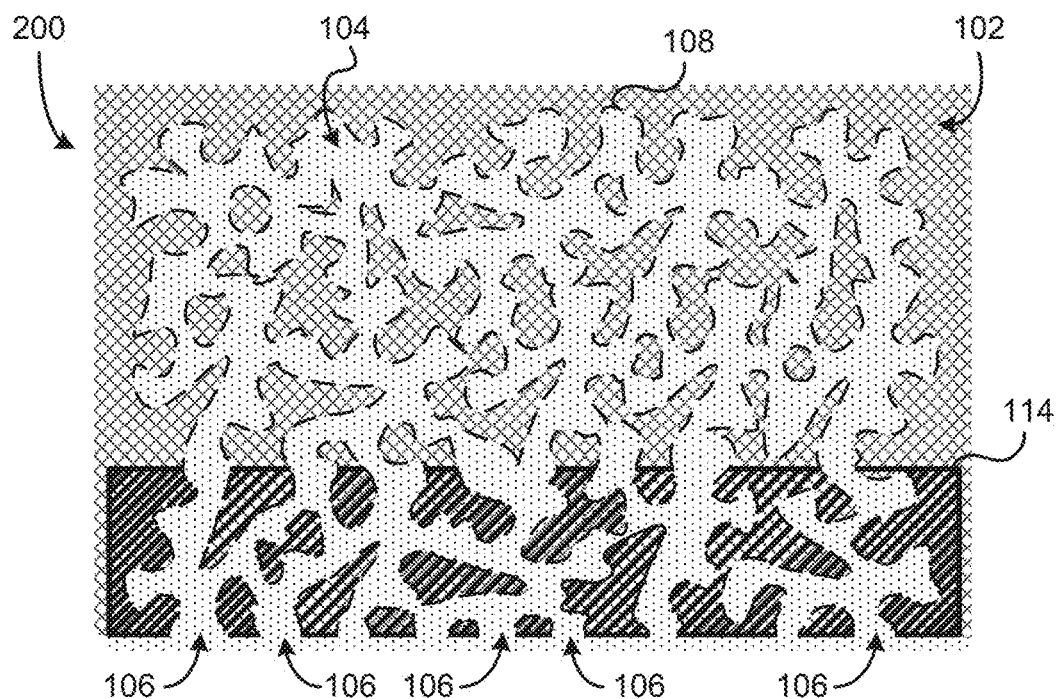
FIG. 2A is a simplified cross-sectional schematic view of a three-dimensional nanoporous membrane having two independent, bicontinuous pore systems, according to another embodiment.
Figure 2B:
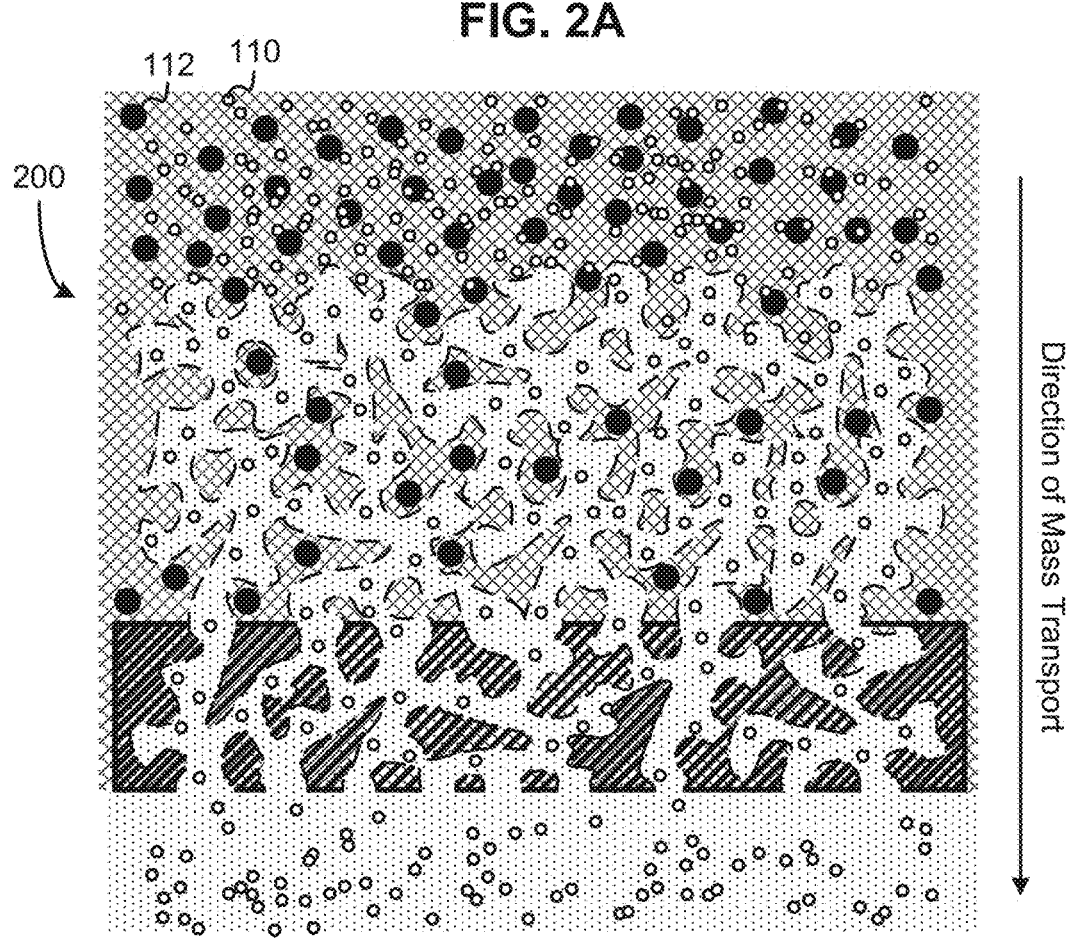
FIG. 2B is a simplified cross-sectional schematic view of a three-dimensional nanoporous membrane having two independent, bicontinuous pore systems exhibiting separation/purification activity, according to another embodiment.

The foregoing principles and descriptions provided with reference to FIGS. 1A-1B are also applicable to the embodiments shown in FIGS. 2A-2B, with the additional feature that the three-dimensional nanoporous membrane 200 includes a second material 114 disposed within the first system of voids 102 along a second end of the three-dimensional nanoporous membrane 200. The second material 114 may comprise a same or similar material as the barrier 108, in various embodiments, and in one preferred embodiment the barrier 108 comprises titania while the second material 114 comprises alumina.

The second material 114 may further facilitate selective mass transport by preventing egress from the three-dimensional nanoporous membrane 200 via avenues other than the macropores 106, e.g. via the first system of voids 102. However, in some embodiments of the structure shown in FIG. 1A the target species 110 may also be transported via the first system of voids 102 and transition across the barrier 108 near the second end of the three-dimensional nanoporous membrane 100. As a result, embodiments including second material 114 may be characterized by a lower flux than embodiments excluding second material 114. Conversely, the second material 114 may convey additional mechanical strength and other structural advantages to the three-dimensional nanoporous membrane 200, in some embodiments.

Accordingly, embodiments excluding second material 114 are preferred, but embodiments including second material 114 should be understood as being within the scope of the presently disclosed inventive concepts. Additional details regarding the function and fabrication of embodiments having a second material 114 disposed in the first system of voids 102 will be discussed further below, with reference to FIGS. 5A-5D.

Figure 3A:
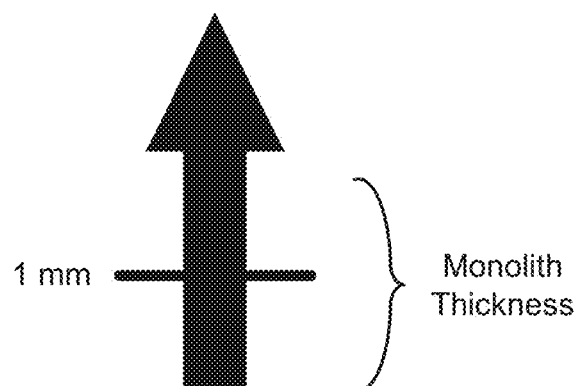
FIG. 3A show a simplified top-down schematic view of a three-dimensional nanoporous membrane monolith, according to one embodiment of the presently disclosed inventive concepts.
Figure 3A:
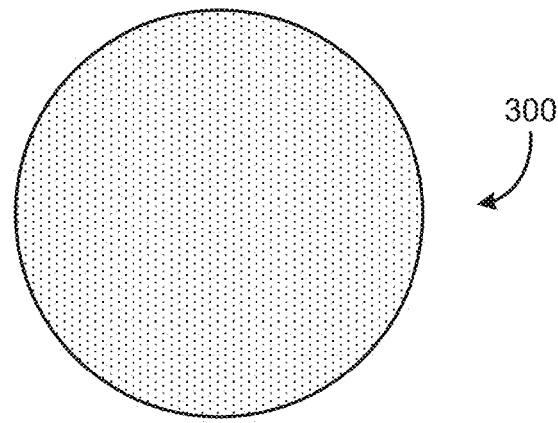
Figure 3B:
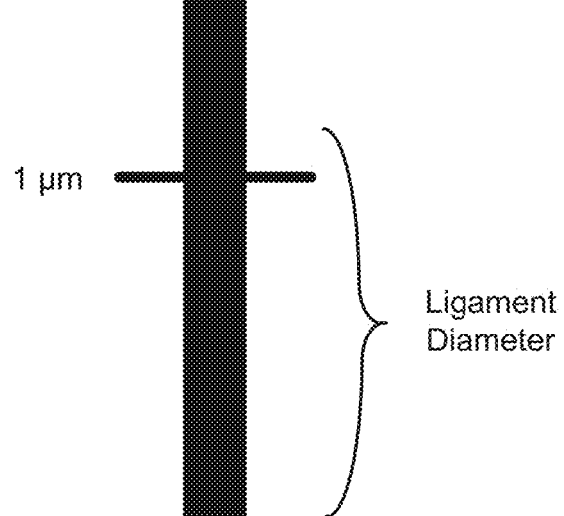
FIG. 3B show a simplified schematic view of a ligament of a three-dimensional nanoporous membrane, according to one embodiment of the presently disclosed inventive concepts.
Figure 3B:
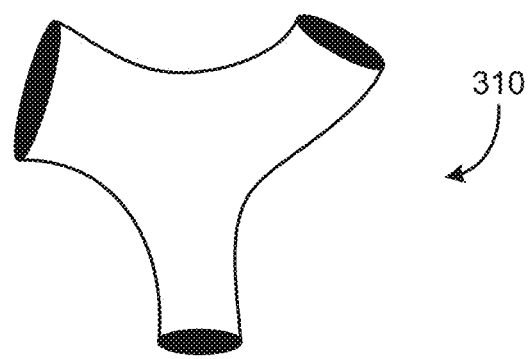
Figure 3C:
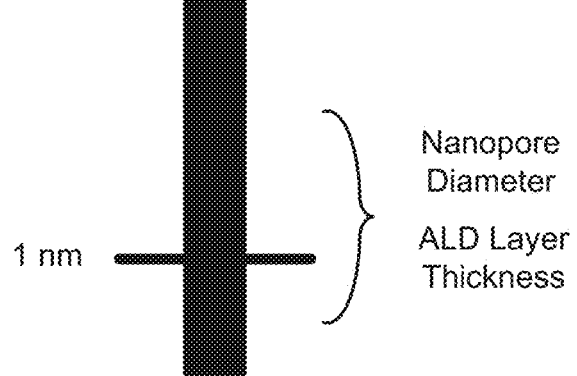
FIG. 3C show a simplified schematic view of a ligament having a plurality of nanopores formed therein, according to one embodiment of the presently disclosed inventive concepts.
Figure 3C:
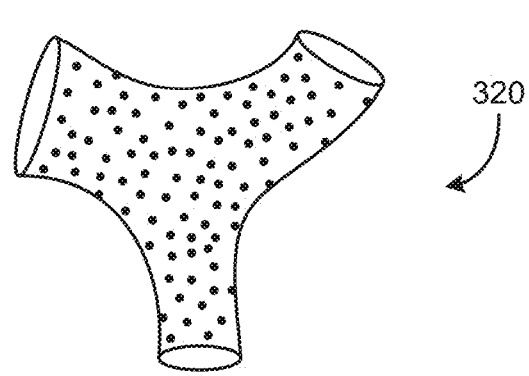

Turning now to FIGS. 3A-3C, an exemplary monolith 300 comprising a three-dimensional nanoporous membrane, e.g. 100 and/or 200, an exemplary ligament structure 310, and an exemplary nanoporous barrier structure 320 are shown, according to various embodiments.

As shown in FIG. 3A, the monolith 300 is characterized by thickness, length and/or diameter dimensions on a millimeter-scale, according to various embodiments. In preferred approaches, the monolith is characterized by a thickness on the order of tens to hundreds of microns, to balance the path length of transiting the nanoporous membrane structure. Thicknesses in excess of several hundred microns may detrimentally impact overall flux, and are thus not preferred but should be considered within the scope of the presently disclosed inventive concepts, according to alternative embodiments.

The monolith may be embodied as a disc configuration, but spherical and/or polygonal configurations may also be employed in various embodiments without departing from the scope of the present disclosures. As described herein, the monolith 300 preferably comprises a microlattice, an aerogel, or a foam-like network of nanotubular ligament shell structures, also referred to herein as the "barrier layer," e.g. barrier 108 depicted in FIGS. 1A-2B.

The monolith 300 may exhibit structural properties such as a modulus in a range from about $1.0 \times 10^4$ MPa to about $5.0 \times 10^2$ MPa, in various embodiments. For example, in two exemplary approaches a nanotubular network of alumina may exhibit a modulus in a range from about 1.0 MPa to about $1.0 \times 10^2$ MPa, while a nanotubular network of titania may exhibit a modulus in a range from about 5.0 MPa to about $1.0 \times 10^2$ MPa.

The monolith 300 may exhibit a density in a range from about $5.0 \times 10^1$ mg/cm$^3$ to about $5.0 \times 10^3$ mg/cm$^3$, in various embodiments. For instance, the nanotubular titania embodiments experimentally evaluated were found to exhibit a density in a range from about $1.1 \times 10^1$ mg/cm$^3$ to about $1.0 \times 10^3$ mg/cm$^3$. Alumina-based nanotubular structures were found to exhibit density in a range from about 1.05 mg/cm$^3$ to about $1.5 \times 10^3$ mg/cm$^3$, in other embodiments.

Furthermore, the monolith 300 may be characterized by a hardness in a range from about $1.0 \times 10^1$ kPa to about $7.5 \times 10^4$ kPa, in various approaches. Exemplary embodiments including nanotubular titania, for instance, have been determined to exhibit a hardness in a range from about $5.0 \times 10^1$ kPa to about $7.5 \times 10^3$ kPa, while nanotubular alumina embodiments have been determined to exhibit a hardness in a range from about $5.0 \times 10^1$ kPa to about $1.0 \times 10^3$ kPa.

With reference to FIG. 39, an exemplary ligament structure 310 is shown, according to one embodiment. As shown in FIG. 3B, the ligament structure 310 is a partial representation of a three-dimensional matrix of nanotubular ligaments which serves as a precursor to the structures depicted in FIGS. 1A-2B. In various embodiments, the ligament structure 310 is characterized by ligaments having a diameter in a range from about 500 nm to about several microns (e.g. 3-5 microns).

The ligament structure 310 may preferably be formed as a result of dealloying an alloy of two or more metals, e.g. dealloying substantially all silver from a silver/gold alloy, to form the three dimensional matrix. Dealloying may be performed using any suitable method and materials as would be appreciated by a skilled artisan upon reading the instant descriptions, without departing from the scope of these disclosures.

Continuing now to FIG. 3C an exemplary nanoporous barrier structure 320 is shown, according to one embodiment. The nanoporous barrier structure 320 may be formed by depositing one or more conformal layers of a material onto a nanotubular ligament structure 310, in various embodiments. Preferred approaches of forming the nanoporous barrier structure 320 include depositing a plurality of layers of the material via atomic layer deposition (ALD) under predetermined environmental conditions. For example, as discussed herein forming the nanoporous barrier structure 320 may include performing ALD on a network of nanotubular ligament structures 310 using a plurality of ALD cycles, e.g. from about 2 cycles to about 100 cycles in various approaches. Preferably, the number of ALD cycles is in a range from about 10 cycles to about 50 cycles, more preferably from about 20 cycles to about 40 cycles, and most preferably about 30 cycles, in different embodiments.

Those having ordinary skill in the art will appreciate that the number of ALD cycles (or other cycles/iterations of other thin film deposition techniques, such as chemical vapor deposition (CVD), physical vapor deposition (PVD), etc.) may be based on a desired thickness of the barrier layer in the final structure, and/or based on a desired porosity of the barrier layer. To facilitate ideal mass transport rates, and selectivity, as well as provide sufficient mechanical strength to the monolith 300, the inventors have experimentally determined that a 30-cycle deposition, particularly using ALD, is desirable, in preferred approaches. In some embodiments, and based at least in part on properties of the target species 110 and/or non-target species 112, the nanopore diameter may be a critical feature to achieve desired mass transport and/or selectivity for separation using the monolith 300 as a nanoporous separation membrane.

Accordingly, the nanoporous barrier structure 320 as shown in FIG. 3C may preferably exhibit a thickness in a range from about 0.5 nm to about 20 nm 0.5 nm to about 10 nm, 0.5 nm to about 7 nm, 0.5 nm to about 5 nm, or any suitable range to achieve the desired exchange pathway length across the barrier and/or mechanical properties for the monolith 300, as would be understood by persons having ordinary skill in the art upon reading the present disclosures. In some embodiments, and based at least in part on properties of the target species 110 and/or non-target species 112, the nanoporous barrier thickness may be a critical feature to achieve desired mass transport and/or selectivity for separation using the monolith 300 as a nanoporous separation membrane. For instance, and for this purpose, in particularly preferred embodiments the thickness of the nanoporous barrier structure is within a range of about 2 nm to about 7 nm.

Environmental factors for which control is desirable during the deposition process include temperature, pressure, and environmental composition. In various embodiments, during deposition cycles, temperature of the surrounding environment in the deposition chamber may be maintained in a range from room temperature (e.g. 23-27° C.) to about 700° C., e.g. about 110° C., about 300° C., or about 500° C., in various approaches, with room temperature and 110° C. being preferred among these ranges. Those having ordinary skill in the art will appreciate that temperature during deposition may strongly influence the size, and particularly the diameter, of the barrier structure within the monolith 300.

In addition, exposure time for each cycle of the deposition process is a desirable feature to precisely control, in many embodiments. Typical deposition processes, and particularly ALD, are characterized by an exposure time on the order of several seconds, e.g. 1-10 seconds, in conventional approaches. By contrast, the presently disclosed inventive deposition techniques are preferably characterized by a significantly longer exposure time, e.g. on the order of $1.0 \times 10^2$-$5.0 \times 10^2$ seconds, with $1.0 \times 10^2$-$3.0 \times 10^2$ seconds being particularly preferred.

The inventors have experimentally determined that this long exposure time is particularly advantageous within the scope of the presently disclosed inventive concepts due to facilitating complete diffusion of precursor gases into pores of the structure. Of course, in various embodiments the exposure time for any two cycles in the deposition process need not be identical, and indeed it may be advantageous in various approaches to use different exposure times, e.g. a gradually increasing exposure time with each cycle.

The foregoing deposition parameters may also be manipulated to generate nanopores within the deposited layers of material, resulting in a nanoporous barrier structure 320 as shown in FIG. 3C. Preferably, the nanopores are characterized by a diameter in a range from about 0.3 nm to about 10 nm, from about 1 nm to about 7 nm, from about 1 nm to about 5 nm, in various approaches. As alluded to above, the nanopore diameter may preferably be determined with respect to properties of the target species 110 and/or non-target species 112, as well as desired mass transport and/or selectivity characteristics for the resulting monolith 300.

In some approaches, the nanopores may exhibit a gradient in diameter along one or more axes of the monolith 300, for instance proximate to a first end of the monolith 300 where target and non-target species 110, 112 are introduced may be characterized by larger pores to facilitate greater flux across the monolith as a whole, while nanopores proximate to a second end of the monolith 300, e.g. where target species 110 egress from the monolith 300 may be characterized by a relatively small diameter, e.g. a diameter slightly larger than a diameter of target species 110. As will be appreciated by skilled artisans upon reading the present disclosures, presence of macropores 106 at the second end of the monolith 300 may assist in facilitating flux through the monolith, while the smaller diameter nanopores in the barrier layer 108 near the second end facilitate excellent selectivity.

Turning now to exemplary techniques for forming suitable structures in accordance with various embodiments of the presently disclosed inventive concepts, two illustrative methods, and various stages thereof, will be described with reference to FIGS. 4A-4D and 5A-5E, respectively. It should be noted that the illustrative methods are provided by way of example, and different orders of operation and/or different precursor, intermediate, and/or final structures may be obtained in other approaches without departing from the scope of the present disclosures.

First, with reference to FIGS. 4A-4D, a preferred approach for forming a three-dimensional nanoporous membrane such as shown in FIGS. 1A-1B is set forth.

Figure 4A:
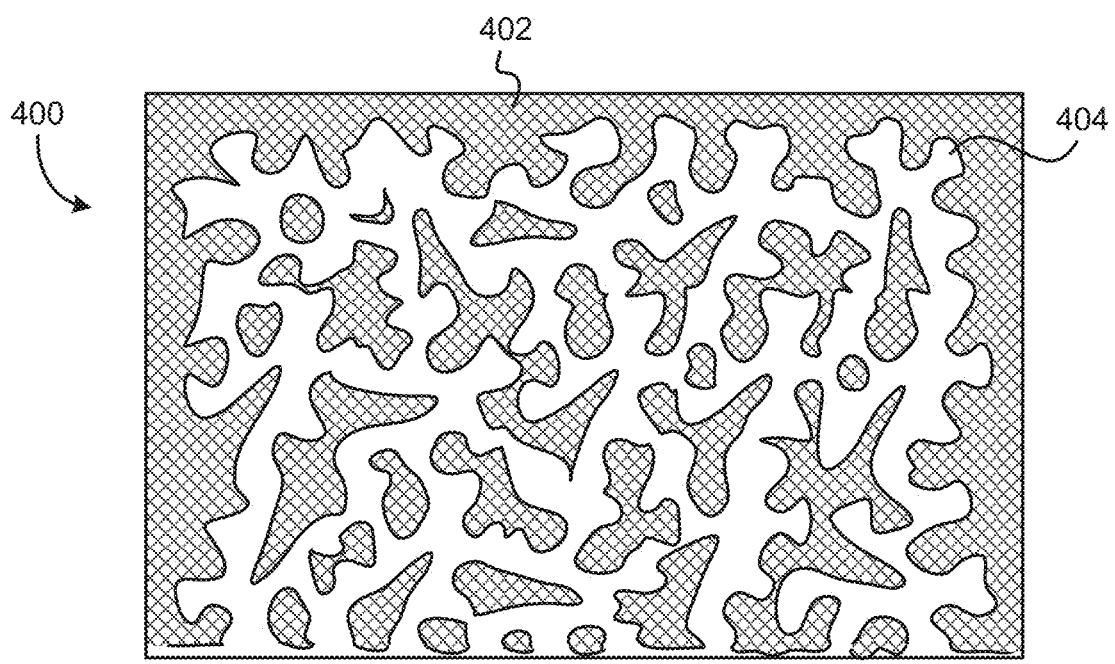
FIGS. 4A-4D illustrate various stages of a process flow for forming a three-dimensional nanoporous matrix, according to one embodiment.

FIG. 4A is a cross-sectional schematic view of a matrix 400 comprising ligaments 404 and voids 402, according to one embodiment. The matrix 400 may be achieved using any suitable technique, and preferably is characterized by ligaments 404 exhibiting characteristics as described above with reference to FIG. 3B. A SEM view of an exemplary matrix comprising ligaments and voids is also shown in FIG. 6B, according to one embodiment.

In particularly preferred approaches, the ligaments comprise, and most preferably consist of, gold and are formed using a dealloying process. For instance, in one embodiment an alloy of silver and gold may be dealloyed using a solution of concentrated nitric acid to remove substantially all (e.g. at least 95%, 98%, 99%, or 99.9%, in various embodiments) silver from the matrix 400. The resulting structure is characterized by a cross-sectional profile as shown in FIG. 4A, including a system of continuous, interwoven ligaments 404 interspersed with voids 402 and having a high surface area on the order of $10^1$ m$^2$/g, especially where the ligaments comprise gold).

Figure 4B:
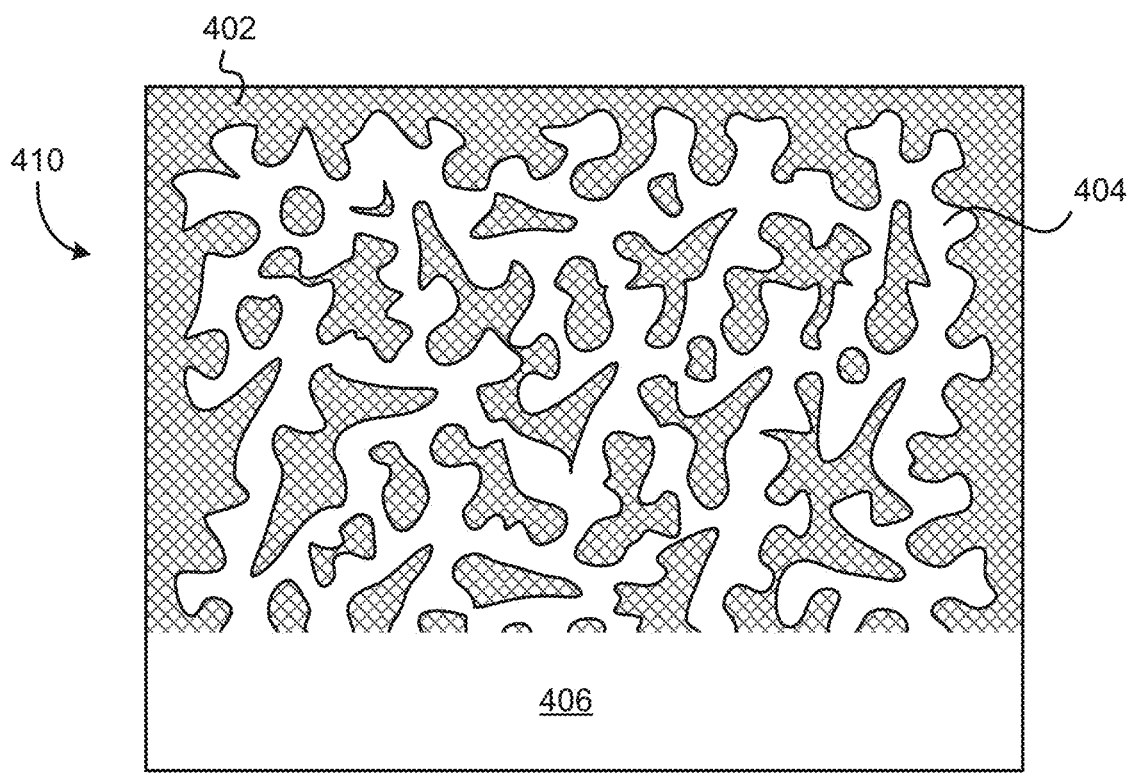

FIG. 4B is a cross-sectional schematic view of a matrix 410 comprising ligaments 404 and voids 402, the bicontinuous matrix being sealed along one end with a cap 406 comprising a second material, according to one embodiment. The matrix 410 may be formed by performing deposition selectively along one end, e.g. a second end as referenced above, of the matrix 410.

The second material may be a same material or different material as the material forming the ligaments 404, but in preferred approaches is a same material to facilitate subsequent removal of the cap 406 and ligament material in a single operation. In particularly preferred approaches, the second material and the ligament material comprise, and most preferably consist of, gold, in an exemplary approach, the cap 406 may be formed by performing magnetron sputtering, electron beam deposition, or any other suitable equivalent technique that would be appreciated by a skilled artisan upon reading the instant disclosures. Regardless of the particular techniques, the second material is deposited selectively on the desired end of the matrix 410 to form a cap 406 having a thickness of several microns.

Figure 7A:
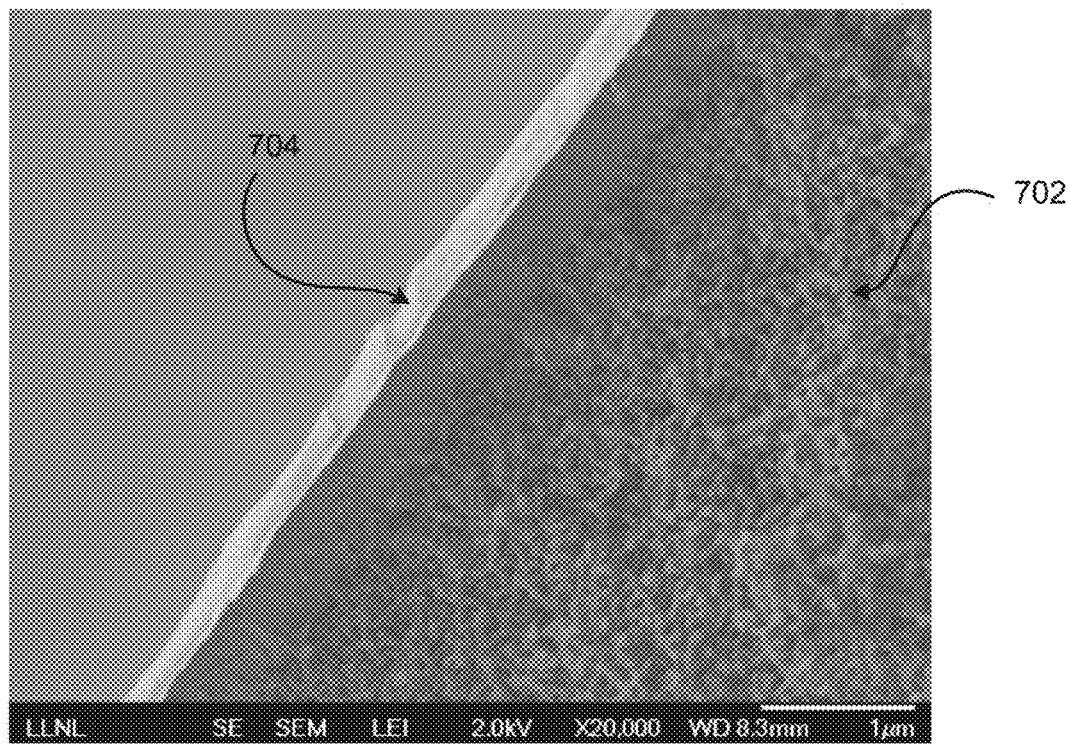
FIG. 7A is a cross-sectional SEM view of a matrix sealed along one end by an additional layer of material, according to one embodiment.
Figure 7B:
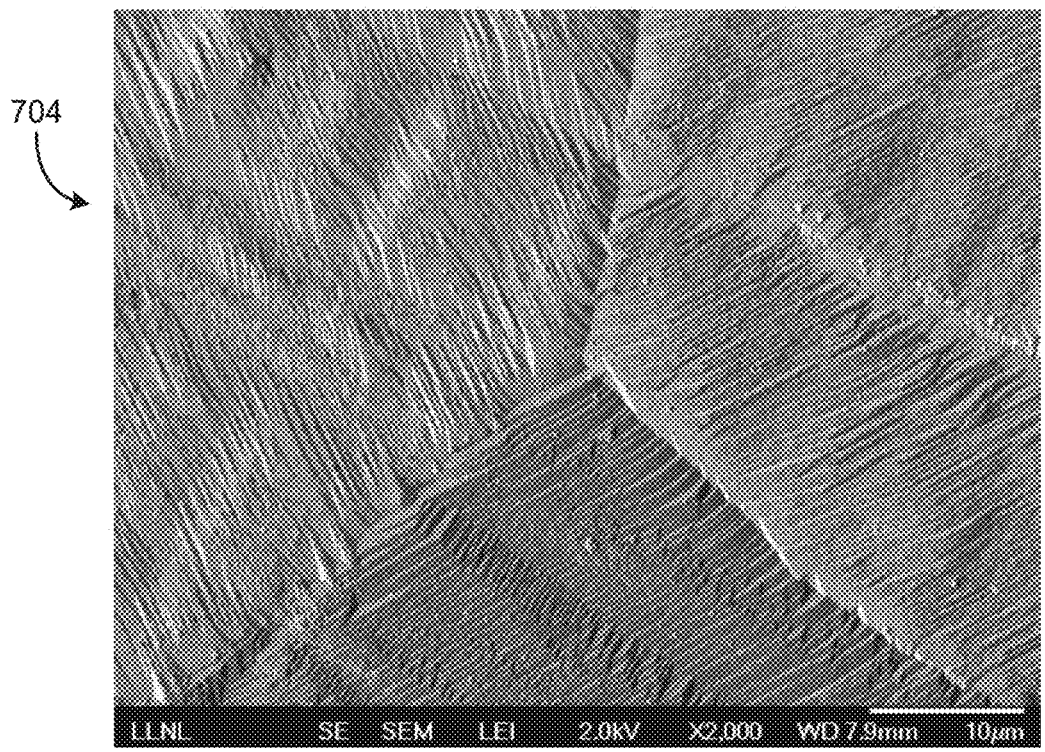
FIG. 7B is a head-on SEM view of the additional layer of material sealing the matrix as shown in FIG. 7A, according to one embodiment.

In one embodiment, the matrix 410 may have a structure substantially as shown according to FIG. 7A, which shows the cap 406 as a layer 704 of material deposited on one end of a matrix 702, which in various embodiments corresponds to matrix 410. FIG. 7B also depicts a SEM image of the layer 704 forming the cap, from a head-on view.

Figure 4C:
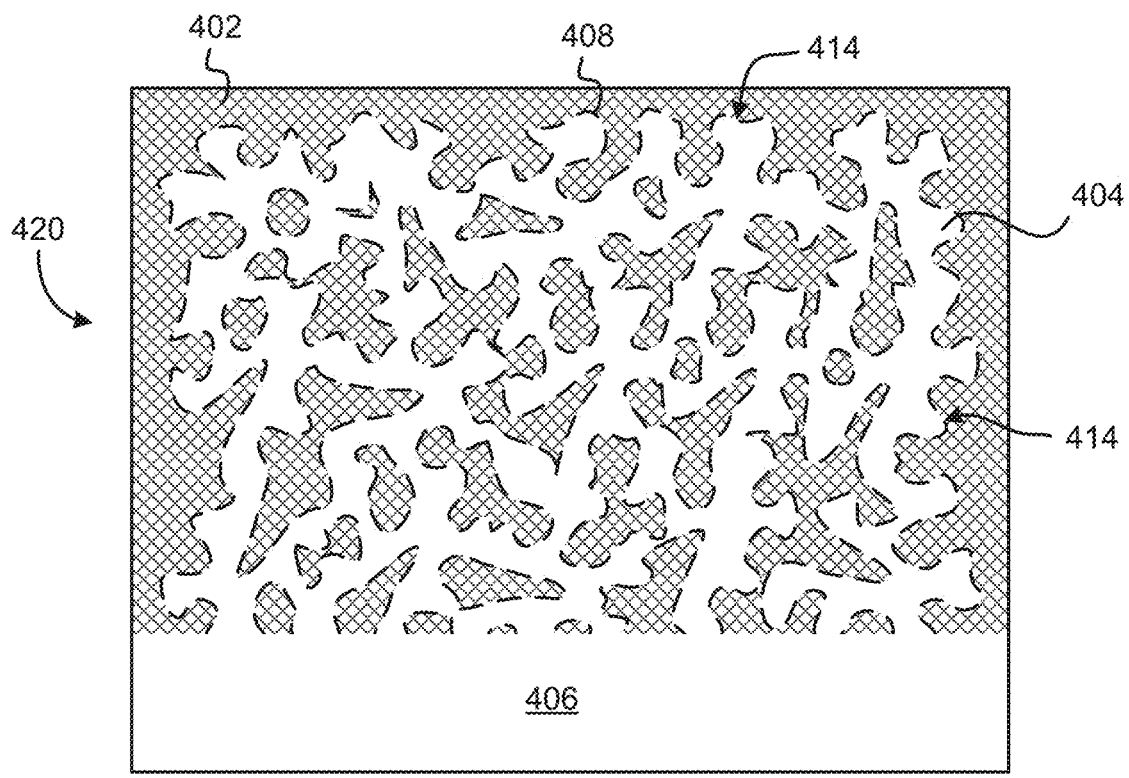

Turning now to FIG. 4C, a cross-sectional schematic view of a matrix 420 comprising ligaments 404 and voids 402 is shown, according to one embodiment. In accordance with the depicted embodiment, the ligaments 404 have formed thereon a conformal nanoporous layer 408 of a material, and the bicontinuous matrix 420 remains sealed along one end with the cap 406, according to one embodiment. The nanoporous layer 408 is characterized by a plurality of nanopores 414, which may be formed based on conditions of the deposition process. Accordingly, and as noted above, the conformal nanoporous layer 408 may be formed using a suitable deposition technique, preferably ALD, in a cyclic manner under predetermined conditions.

In various approaches, the material may be deposited to a different thickness on different portions of the matrix 420. For instance, in one approach a thickness of the conformal nanoporous layer 408 may exhibit a gradient along one axis of the matrix. In a particular embodiment, for example, the thickness of the conformal nanoporous layer 408 may be relatively low (e.g. 1-5 nm) near a first end of the matrix 420 (e.g. where target and non-target species 110, 112) are introduced to the matrix in order to facilitate short exchange pathway length and thus transitioning of the target species 110 into the second set of voids, discussed below with respect to FIG. 4D. Conversely, near a second end of the matrix the conformal nanoporous layer 408 may be deposited to a relatively high thickness (e.g. 5-20 nm) in order to facilitate selectivity to target species 110, e.g., near an egress point such as macropores 106 as shown in FIGS. 1A-1B.

In addition, the material from which the conformal nanoporous layer 408 is formed may include metal oxides such as titania, alumina, zinc oxide, etc. as would be understood by a person having ordinary skill in the art upon reading the present descriptions. In more embodiments, the material from which the conformal nanoporous layer 408 is formed may include metals such as tungsten, platinum, etc. Further still, the material from which the conformal nanoporous layer 408 is formed may include nonmetal oxides such as silica.

Figure 4D:
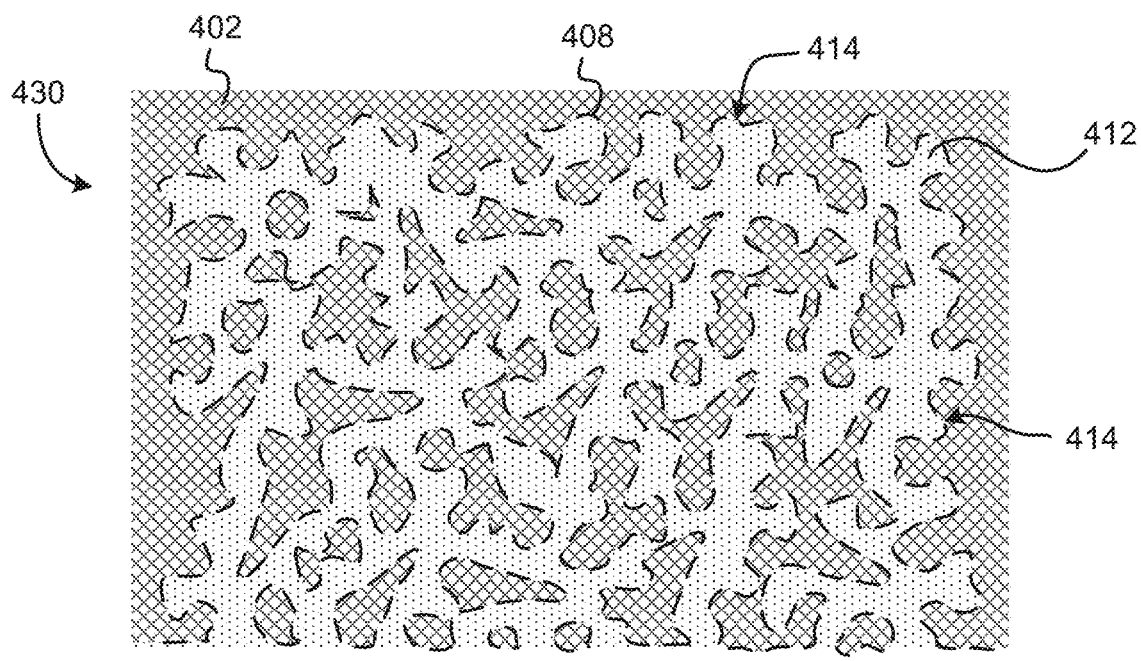

With reference to FIG. 4D, a nanoporous separation membrane 430 such as shown in FIG. 1A is depicted according to a cross-sectional schematic view of an illustrative embodiment. The membrane 430 is a three-dimensional nanoporous membrane having two independent, bicontinuous pore systems formed from a first system of voids 402 and a second system of voids 412. The void systems 402, 412 are separated by the conformal nanoporous layer 408 of the material formed on the ligaments 404 in FIG. 4C. Notably, the membrane 430 structure is preferably formed in a single step along with removal of the cap 406.

In particularly preferred approaches, the single step involves etching away the ligament material of ligaments 404 and the second material of the cap 406 using a suitable etching solution. Most preferably, e.g. where the ligament material and second material comprise, or consist of, gold, etching may be accomplished by reacting the membrane with an aqueous solution of potassium iodide and iodine ($KI/I_2$) for a duration sufficient to etch away substantially all gold (e.g. 95%, 98%, 99%, 99.9%, in various embodiments) of the ligament material and the second material from the membrane 430. In one illustrative approach, the etching process may be performed for a duration of several hours to one day (24 hours), and may involve immersing the structure shown in FIG. 4C in a bath of the etching solution.

Importantly, various embodiments of the presently disclosed inventive concepts include performing the etching process in conjunction with and/or followed by supercritical drying of the resulting nanoporous barrier structure. Supercritical drying facilitates the ultra-thin walls of the nanoporous barrier retaining structural integrity during the drying process, and for thicknesses in a range from about 2 nm to about 10 nm, it may not be possible to achieve a structurally self-supporting membrane without supercritical drying.

Figure 8:
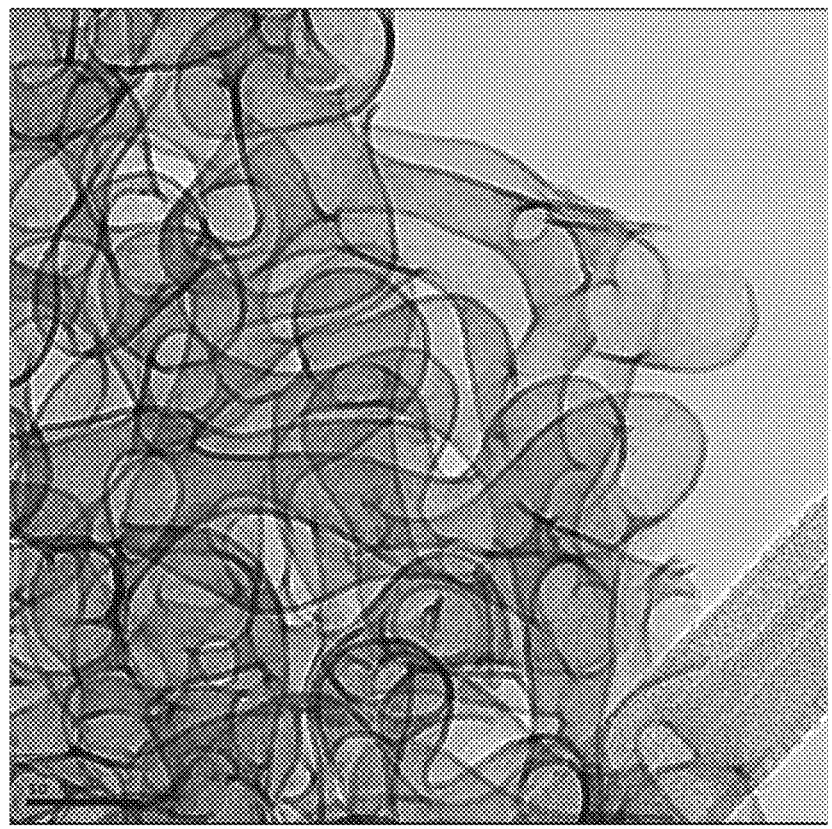
FIG. 8 is a SEM view of exemplary nanotubular structures exhibiting nanopores, in accordance with one embodiment.

The resulting structure retains the barrier layer 408 including nanopores 414 therein that separate the first and second systems of voids 402, 412, and the nanopores function as exchange sites that facilitate selective transport of target species 110 from the first system of voids 402 into the second system of voids 412, and ultimately transport throughout the membrane 430 to macropores on a second end of the membrane 430. A SEM view of the nanotubular structures forming the barrier layer 408 and nanopores formed therein is shown in FIG. 8, according to one embodiment.

Turning now to a second exemplary approach for forming suitable nanoporous membrane structures as discussed herein, FIGS. 5A-5E depict one embodiment and various stages thereof.

Figure 5A:
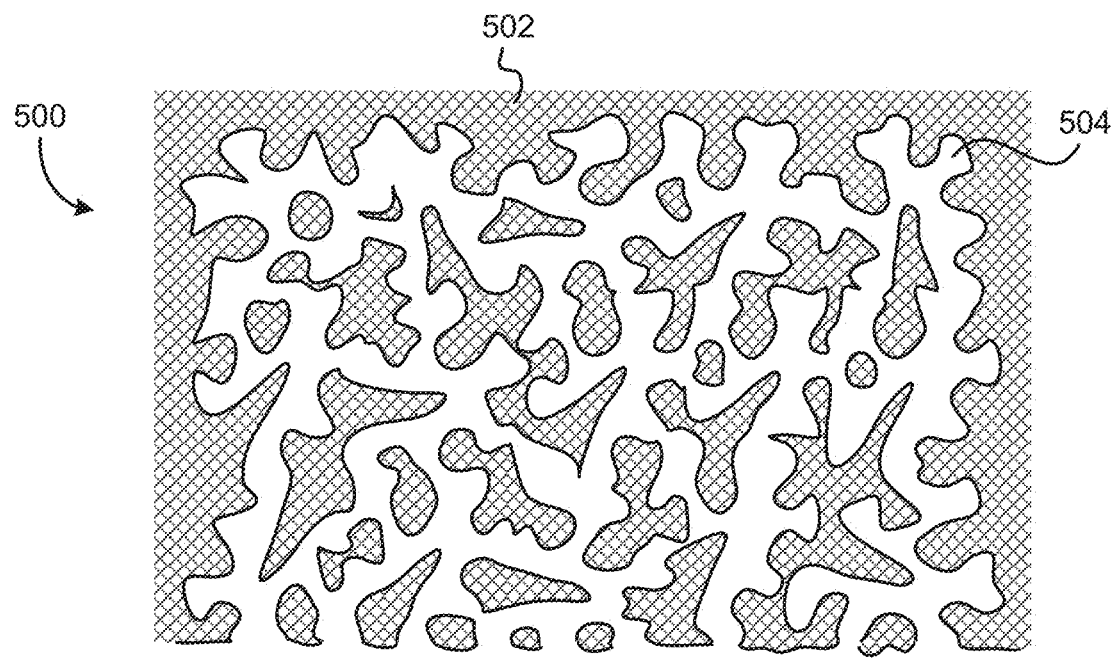
FIGS. 5A-5E illustrate various stages of a process flow for forming a three-dimensional nanoporous matrix, according to one embodiment.

FIG. 5A is a cross-sectional schematic view of a matrix 500 comprising ligaments 504 and voids 502, according to one embodiment. As noted above regarding FIG. 4A, the matrix 500 may be achieved using any suitable technique, and preferably is characterized by ligaments 504 exhibiting characteristics as described above with reference to FIG. 3B. A SEM view of an exemplary matrix comprising ligaments and voids is also shown in FIG. 6B, according to one embodiment.

In particularly preferred approaches, the ligaments comprise, and most preferably consist of, gold and are formed using a dealloying process. For instance, in one embodiment an alloy of silver and gold may be dealloyed using a solution of dilute nitric acid to remove substantially all (e.g. at least 95%, 98%, 99%, or 99.9%, in various embodiments) silver from the matrix 500. The resulting structure is characterized by a cross-sectional profile as shown in FIG. 5A, including a system of continuous, interwoven ligaments 504 interspersed with voids 502 and having a high surface area (e.g. on the order of $10^1$ $m^2/g$).

Figure 5B:
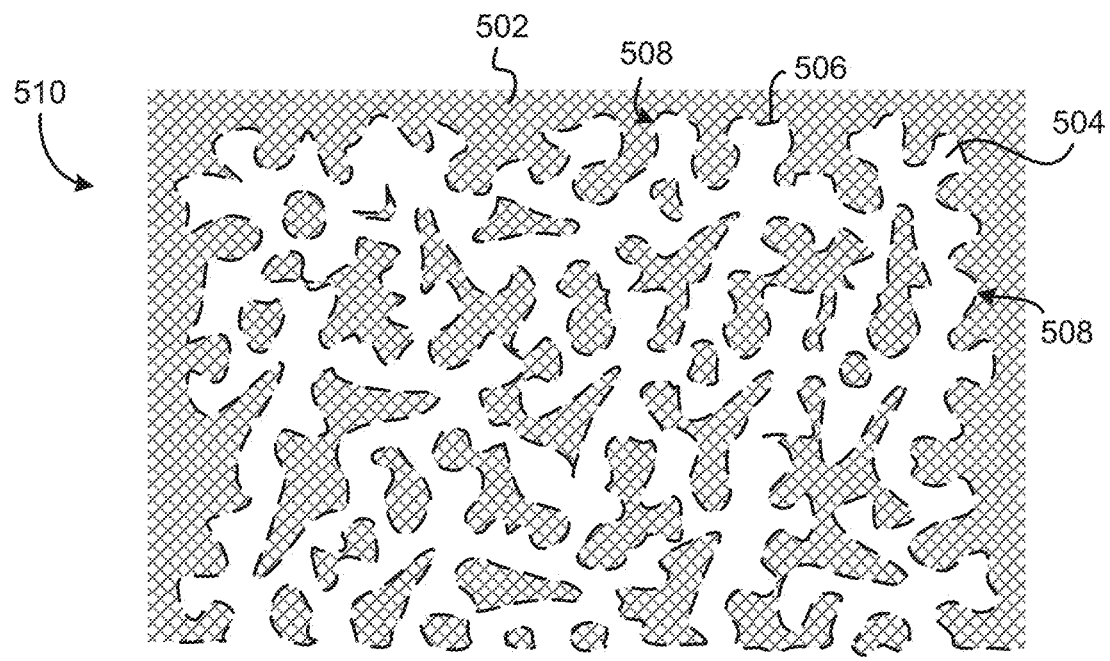

FIG. 5B is a cross-sectional schematic view of a matrix 510 comprising ligaments 504 and voids 502, the ligaments having formed thereon a conformal nanoporous layer 506 of a material, such as titania, alumina, zinc oxide, platinum, silica, tungsten, etc., according to one embodiment. The nanoporous layer 506 is characterized by a plurality of nanopores 508, which may be formed based on conditions of the deposition process. Accordingly, and as noted above, the conformal nanoporous layer 506 may be formed using a suitable deposition technique, preferably ALD, in a cyclic manner under predetermined conditions.

Figure 5C:
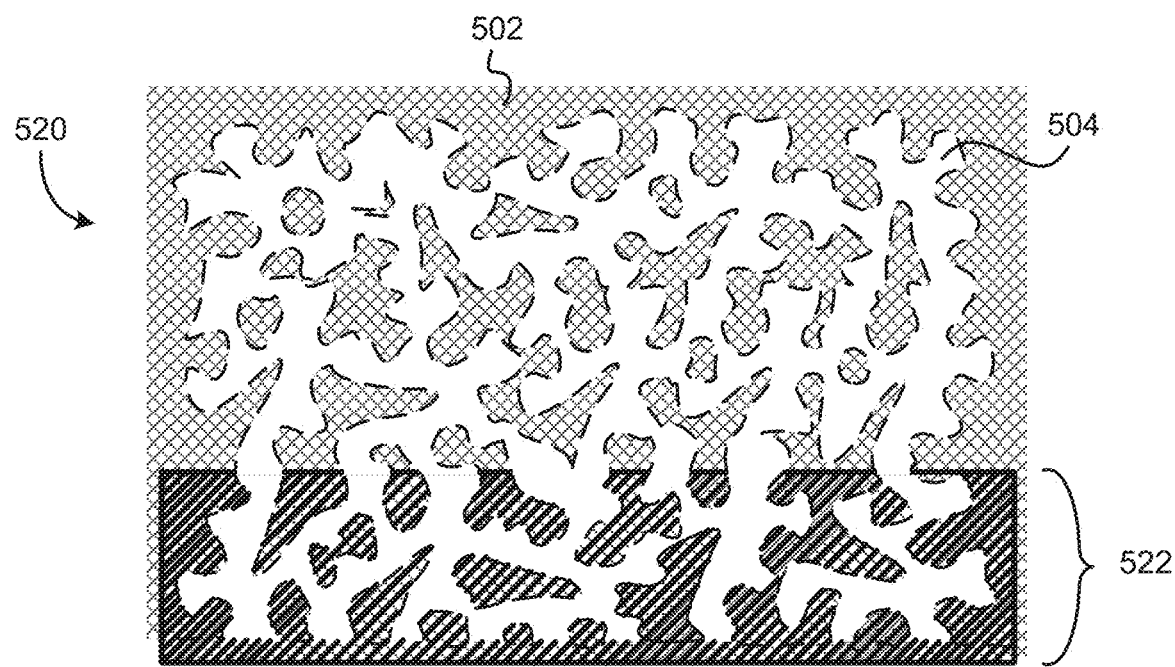

In one illustrative embodiment, FIG. 5C is a cross-sectional schematic view of a matrix 520 comprising ligaments 504 and voids 502, the ligaments 504 having formed thereon a conformal nanoporous layer 506 of a material (as discussed above regarding layer 506 in FIG. 5B), and the voids 502 of the bicontinuous matrix being sealed along one end in region 522. SEM images of a partially sealed region 620 and fully sealed region 630, according to various embodiments, are respectively shown in FIGS. 6C and 6D.

In preferred approaches, sealing the voids 502 along region 522 comprises depositing a second material on the ligaments 504 and conformal nanoporous layer 506 to fill the voids. Moreover, the region 522 may be characterized by extending beyond the terminal portions of the ligaments 504 within region 522, forming a cap on at least one end of the matrix 520. The thickness and/or depth of penetration of the region 522 may be in a range from 1-10 microns, in various embodiments, and the cap may be formed via ALD of the second material onto the ligaments 504. The second material may include a same or different material as deposited to form the conformal nanoporous layer 506, as well as or alternatively including an epoxy resin, in various embodiments.

Figure 5D:
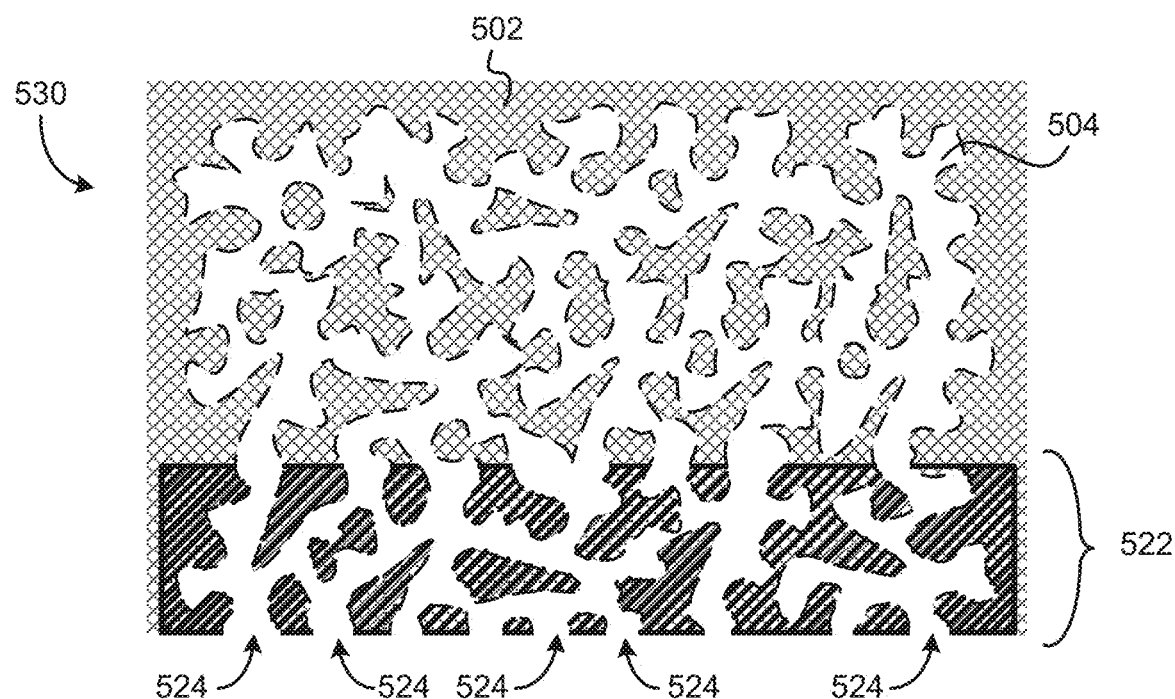

FIG. 5D is a cross-sectional schematic view of a matrix 530 comprising ligaments 504 and voids 502, the ligaments having formed thereon a conformal nanoporous layer 506 of a material, the voids of the bicontinuous matrix being sealed along one end of the matrix 530, e.g. in region 522, and terminal portions 524 of the ligaments 504 being exposed along the one end of the matrix 530, according to one embodiment. The structure shown in FIG. 5D may be obtained by removing the second material from region 522 in proximity to the terminal portions 524 of the ligaments 504 until the ligaments are exposed along a corresponding end of the matrix 530.

Figure 5E:
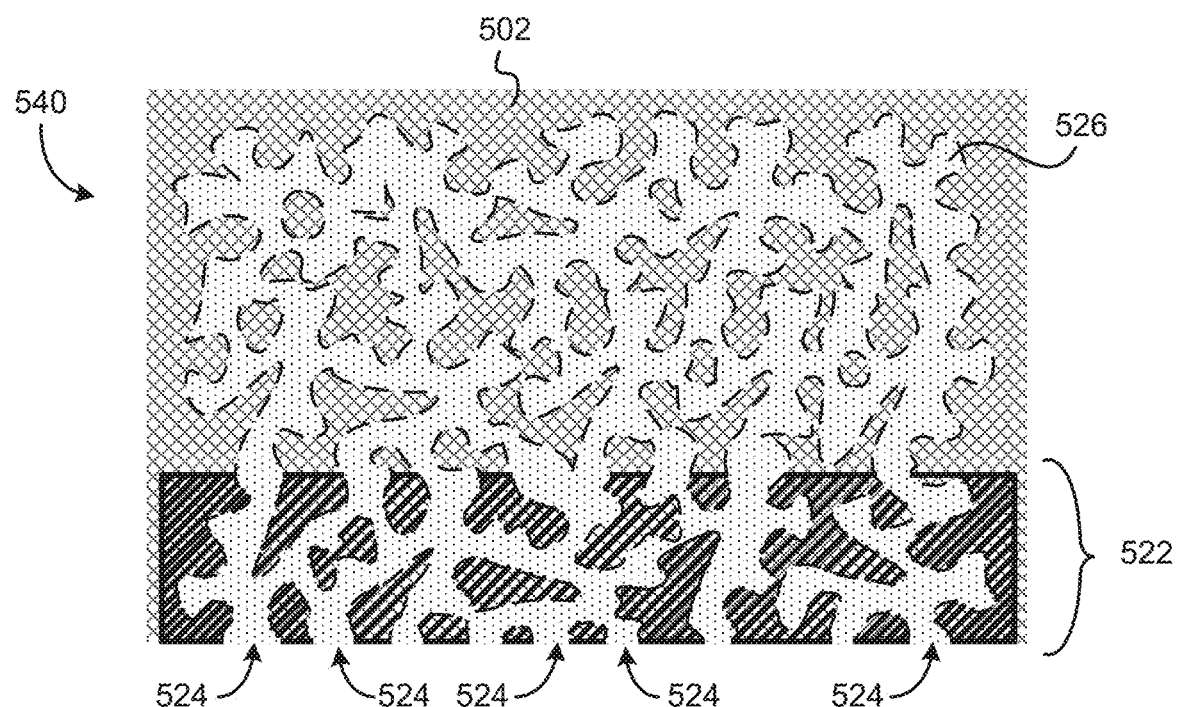

FIG. 5E is a cross-sectional schematic view of a three-dimensional nanoporous membrane 540 having two independent, bicontinuous pore systems 502, 526 separated by the conformal nanoporous layer 506 of the material formed in FIG. 5B, according to one embodiment.

In particularly preferred approaches, forming the second system of continuous voids 526 involves etching away the ligament material of ligaments 504 using a suitable etching solution. Most preferably, e.g. where the ligament material comprises, or consists of, gold, etching may be accomplished by reacting the membrane with an aqueous solution of potassium iodide and iodine ($KI/I_2$) for a duration sufficient to etch away substantially all gold (e.g. 95%, 98%, 99%, 99.9%, in various embodiments) of the ligament material and the second material from the membrane 540. In one illustrative approach, the etching process may be performed for a duration of several hours to one day (24 hours), and may involve immersing the structure shown in FIG. 5D in a bath of the etching solution. After removal of the ligament material, the terminal portions 524 of the ligaments are converted into macropores to facilitate mass transport throughout the membrane 540.

Although the foregoing exemplary process flows, and various stages thereof, have been presented in a particular order, it should be understood that variations thereon may be implemented without departing from the scope of the instant disclosures.

Turning now to FIGS. 6A-6D, exemplary SEM images of a matrix and three regions of interest thereof are shown, according to several illustrative embodiments. The SEM images correspond to a structure fabricated using the approach set forth above with respect to FIGS. 5A-5E, including sealing at least one end of the matrix in a region 522.

Figure 6A:
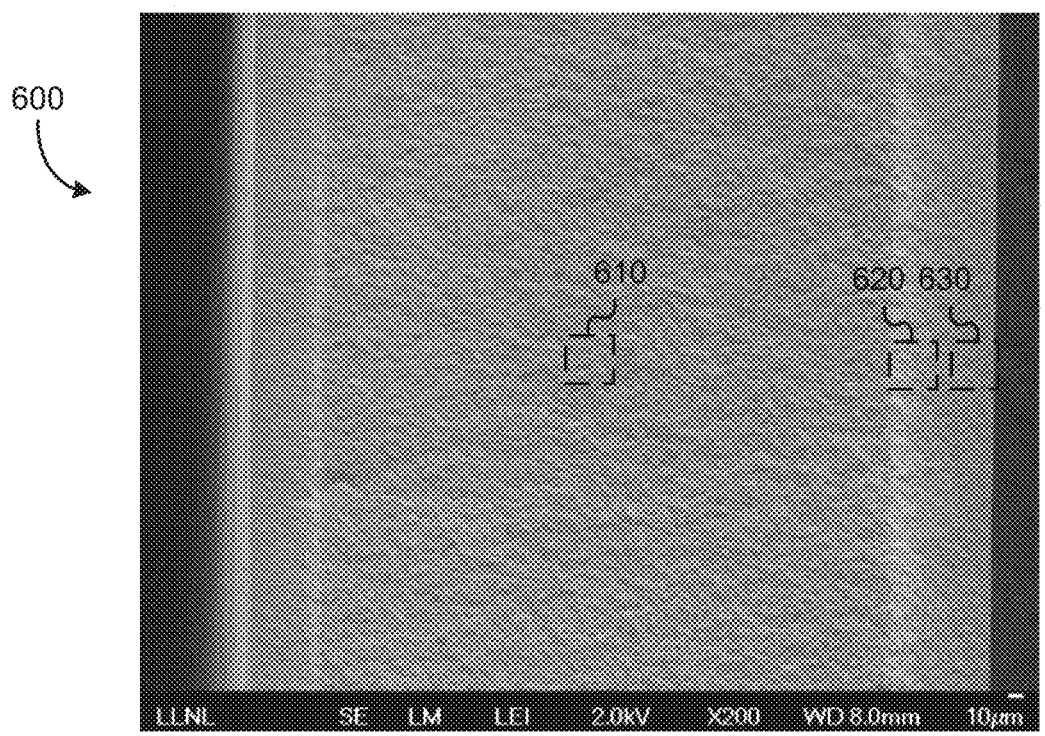
FIG. 6A is a scanning electron microscope (SEM) image of a matrix, according to one embodiment.
Figure 6B:
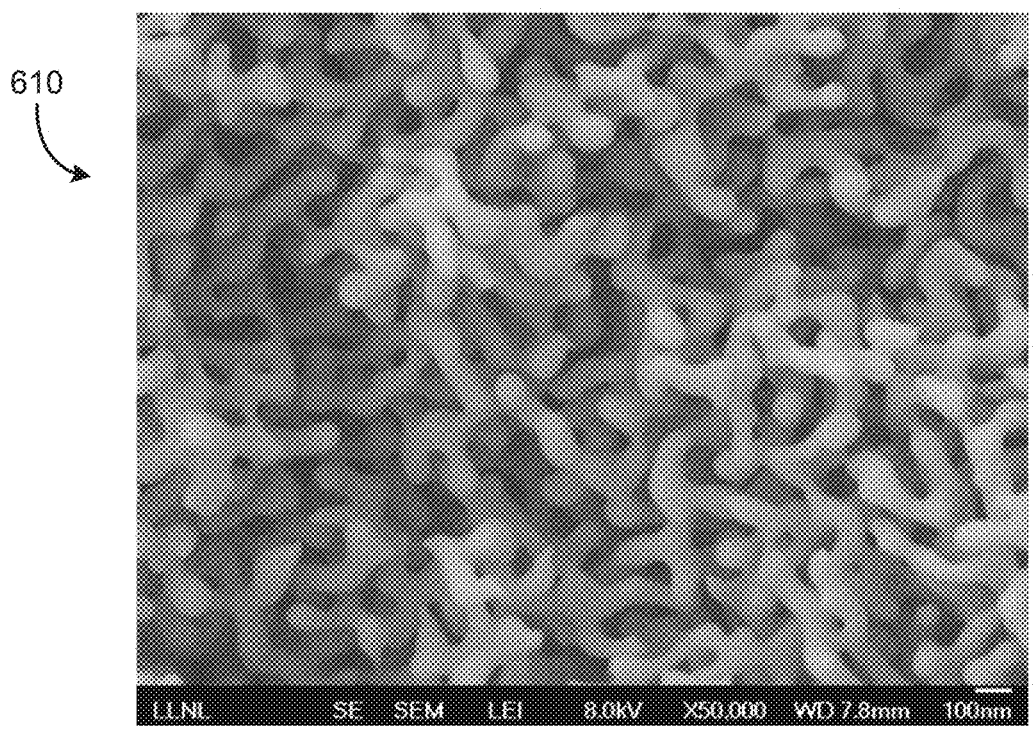
FIG. 6B is a scanning electron microscope (SEM) image of voids and ligaments of the matrix shown in FIG. 6A, according to one embodiment.
Figure 6C:
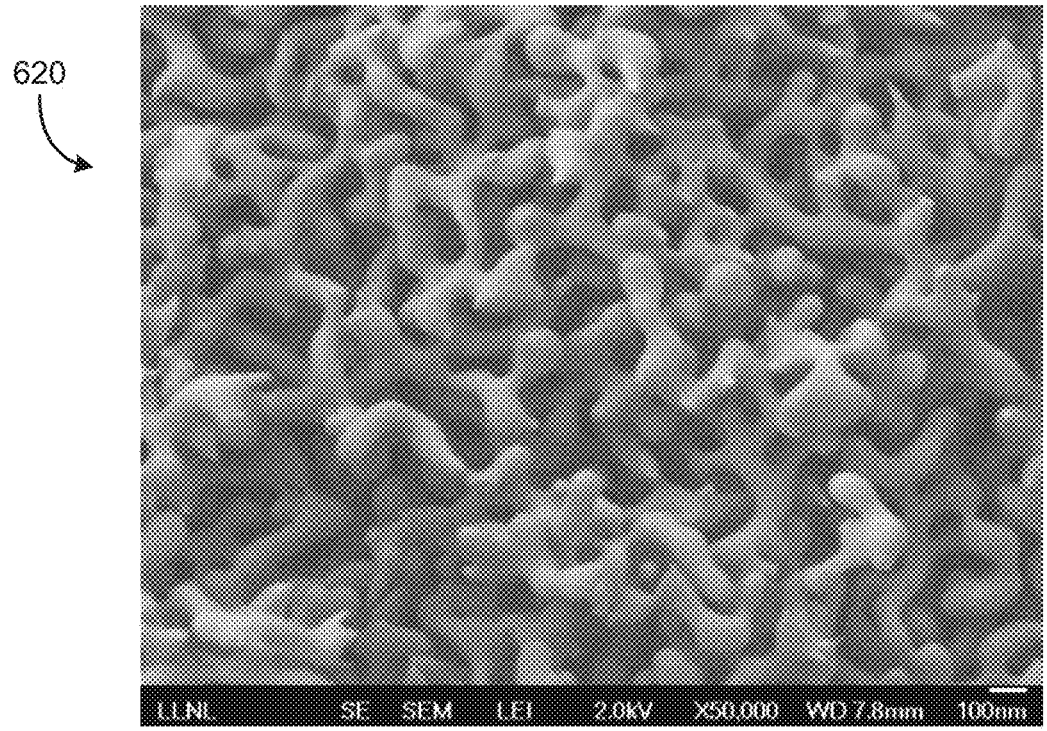
FIG. 6C is a scanning electron microscope (SEM) image of voids and ligaments of the matrix shown in FIG. 6A, the voids being partially filled to form a partial seal along one end of the matrix, according to one embodiment.
Figure 6D:
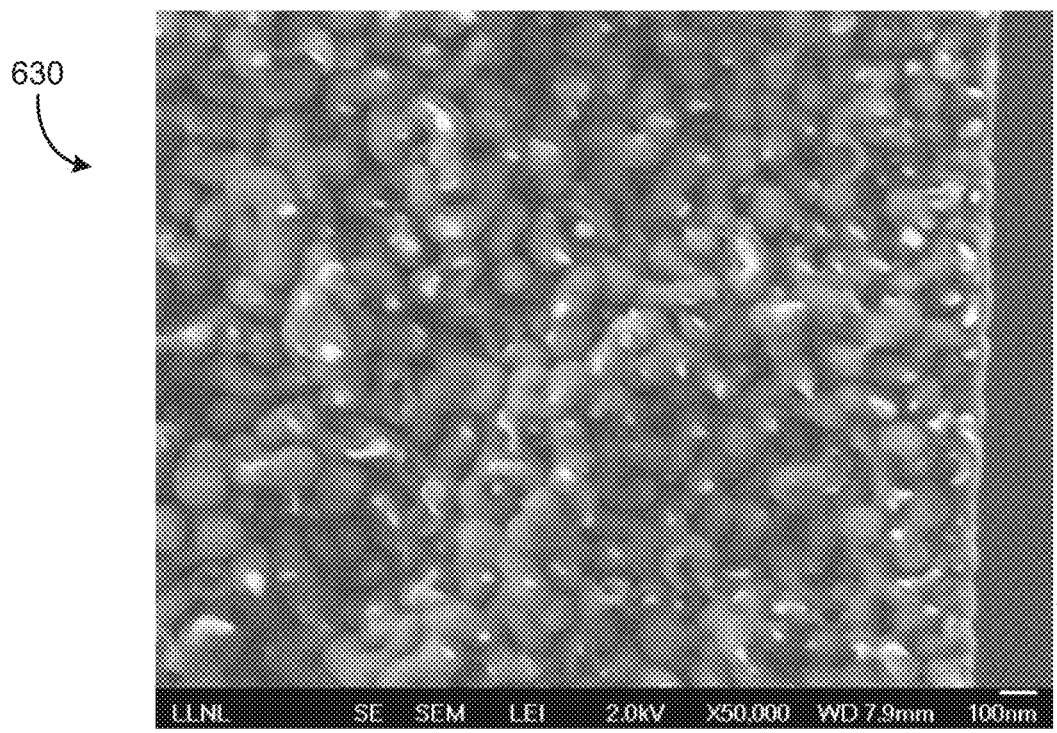
FIG. 6D is a scanning electron microscope (SEM) image of voids and ligaments of the matrix shown in FIG. 6A, the voids being effectively filled to form a seal along one end of the matrix, according to one embodiment.

As shown in FIG. 6A, a matrix 600 includes a plurality of ligaments interspersed with voids. In a region along one end of the matrix, e.g., region 522 as shown in FIGS. 5D-5E, the voids may be sealed with a second material. According to the view shown in FIGS. 6A-6D, region 610 includes ligaments interspersed with voids, without any second material, while region 620 includes ligaments interspersed with voids and partially filled with the second material, and region 630 includes ligaments with former voids fully filled with the second material.

Figure 9:
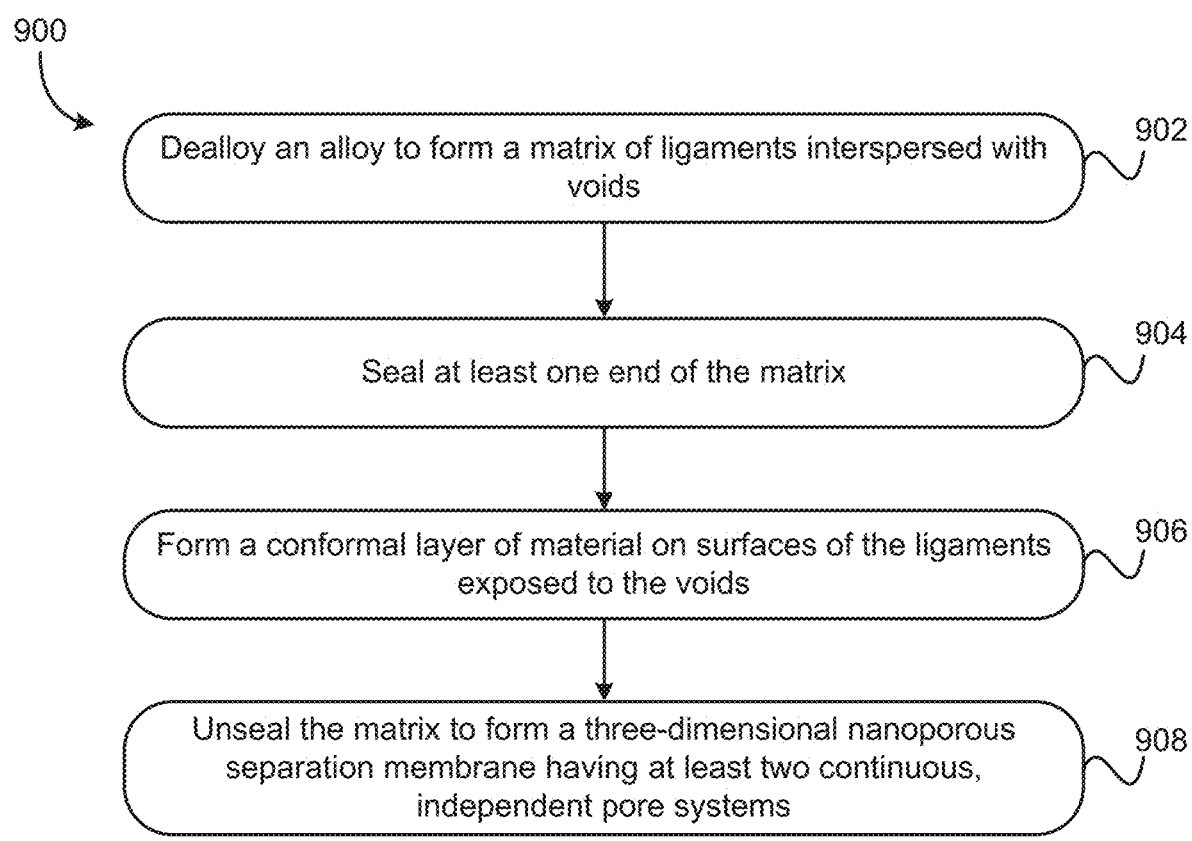
FIG. 9 is a flowchart of a method for forming a three-dimensional nanoporous membrane having two independent, bicontinuous pore systems, according to various embodiments.

Referring now to FIG. 9, a flowchart of a method 900 is shown, according to one embodiment. The method may be performed in any suitable environment, and may be employed to form structures such as shown in FIGS. 1A-8, in various approaches. The operations of the method 900 may be performed in any suitable order, and the particular presentation depicted in FIG. 9 should be understood as exemplary and not limiting on the scope of the present disclosures.

In accordance with FIG. 9, method 900 includes operation 902, in which an alloy is dealloyed to form a matrix of ligaments interspersed with voids. Preferably, the ligaments and voids are respectively characterized by being continuous along a length or thickness of the matrix.

Operation 904 of method 900 further includes sealing at least one end of the matrix. Sealing may be accomplished, in alternative embodiments, using either or both of the approaches discussed above regarding FIGS. 4A-4D and/or 5A-5E.

In operation 906 of method 900, a conformal layer of material is formed on surfaces of the ligaments exposed to the voids. As discussed above, the conformal layer is preferably an ultra-thin (e.g. 2-7 nm) layer characterized by a plurality of nanopores disposed therein.

Unsealing the matrix is performed in operation 908, resulting in a three-dimensional nanoporous separation membrane having at least t continuous, independent pore systems. Exemplary embodiments of such a three-dimensional nanoporous separation membrane are discussed above.

The base operations 902-908 of method 900 may, in various embodiments, be performed in any suitable order, and may additionally and/or alternatively include any number of other features, operations, etc. as disclosed herein. For example, in myriad embodiments method 900 may include any one or more of the following.

In one embodiment, method 900 involves dealloying an alloy gold and silver, and the dealloying includes removing substantially all silver from the alloy by etching with an aqueous nitric acid solution to form the matrix of ligaments.

In another embodiment, the sealing of operation 904 includes either or both of: forming a solid film enclosing the at least one end of the matrix of ligaments; and depositing one or more of the material and a second material within the first system of continuous voids proximate to the at least one end of the matrix of ligaments.

Depositing the material, in various embodiments, may include atomic layer deposition (ALD); and depositing the second material comprises magnetron sputtering or electron beam deposition.

The forming step of operation 906 may include: depositing a plurality of layers of the material on the surfaces of the ligaments exposed to the voids via atomic layer deposition (ALD); where the ALD is performed for a number of cycles ranging from about 10 cycles to about 300 cycles and each ALD cycle is characterized by an exposure time in a range from about 60 seconds to about 300 seconds.

The unsealing step set forth in operation 908 may include at least one of: polishing the at least one end of the matrix to expose terminal portions of the ligaments proximate to the at least one end of the matrix; and replacing the ligaments of the matrix with a second system of continuous voids. The resulting two or more continuous, independent pore systems comprise a first system of continuous voids and a second system of continuous voids, where the first system of continuous voids and the second system of continuous voids are separated by a nanoporous barrier comprising the material deposited via ALD.

Further still, the replacing step noted above may include etching the ligaments with an aqueous potassium iodide/iodine solution; supercritically drying nanoporous barrier. Preferably, the ligaments comprise gold.

In particularly preferred embodiments, the method 900 may include forming a gradient in a diameter of the nanopores across the three-dimensional nanoporous separation membrane. Forming the gradient may generally include incubating the three-dimensional nanoporous separation membrane in a temperature gradient environment to selectively anneal the diameter of the nanopores across the three-dimensional nanoporous separation membrane. For instance, in one approach applying the temperature gradient may involve incubating the three-dimensional nanoporous separation membrane in a chamber having two or more heating elements tuned to a different temperature, or alternatively selectively applying laser annealing to desired portions of the three-dimensional nanoporous separation membrane.

Applications/Uses

Embodiments of the present invention may be used in a wide variety of applications, particularly those applications which involve separation of target species from non-target species; e.g. solutes from solvents, gas mixtures, etc. In addition, the presently disclosed inventive concepts will be understood to have applicability to energy storage, e.g. as separators in lithium-ion batteries, in more embodiments. Furthermore, the presently disclosed inventive concepts may be applied to formation of highly sensitive and selective chemical sensors, in still more embodiments. As will be appreciated by persons having ordinary skill in the art upon reading the present disclosures, the instantly described structures, materials and techniques are also pertinent to photocatalytic systems and applications.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A composition of matter, comprising:
    a first system of continuous voids arranged in a three-dimensional matrix;
    a second system of continuous voids arranged in the three-dimensional matrix; and
    a nanoporous barrier separating the first system of continuous voids and the second system of continuous voids; and
    wherein the first system of continuous voids and the second system of continuous voids are interwoven but independent so as to form a plurality of channels through the three-dimensional matrix.

2. The composition of matter as recited in claim 1, wherein the nanoporous barrier comprises a material selected from zinc oxide, alumina, titania, and silica.

3. The composition of matter as recited in claim 1, wherein the nanoporous barrier comprises a plurality of pores each having a diameter in a range from about 0.3 nm to about 10 nm.

4. The composition of matter as recited in claim 1, wherein the nanoporous barrier is characterized by a maximum thickness in a range from about 0.5 nm to about 10 nm throughout the three-dimensional matrix.

5. The composition of matter as recited in claim 1, wherein the second system of continuous voids are characterized by a diameter in a range from about 50 nm to about 1500 nm throughout the three-dimensional matrix.

6. The composition of matter as recited in claim 1, wherein the three dimensional matrix is characterized by a length or a diameter in a range from about 800 μm to about 5 mm and a thickness in a range from about 1 μm and about 300 μm.

7. The composition of matter as recited in claim 1, comprising a sealant disposed within the first system of continuous voids near a first end of the three-dimensional matrix, wherein the sealant effectively prevents mass transport via the first system of voids through the first end of the three-dimensional matrix.

8. The composition of matter as recited in claim 7, wherein the nanoporous barrier comprises titania; and
    wherein the sealant comprises alumina.

9. The composition of matter as recited in claim 1, comprising one or more chemical species functionalized on one or both sides of the nanoporous barrier.

10. The composition of matter as recited in claim 9, the chemical species being selected from a group consisting of carboxyl, hydroxyl, ammonia and amine.

11. The composition of matter as recited in claim 1, wherein the nanoporous barrier is characterized by a gradient in nanopore diameter along a first axis of the three-dimensional matrix.

12. The composition of matter as recited in claim 1, wherein an average size of the voids of the first system of voids are larger than an average size of the voids of the second system of voids.

13. The composition of matter as recited in claim 3, wherein an average size of the voids of the first system of voids are larger than an average size of the voids of the second system of voids.

14. The composition of matter as recited in claim 1, wherein the nanoporous barrier is a nanoporous layer forming a porous shell around the second system of continuous voids.

15. The composition of matter as recited in claim 3, wherein the second system of continuous voids are characterized by a diameter in a range from about 50 nm to about 1500 nm throughout the three-dimensional matrix.

16. The composition of matter as recited in claim 7, wherein the sealant effectively allows mass transport via the second system of voids through the first end of the three-dimensional matrix.

17. The composition of matter as recited in claim 1, wherein the nanoporous barrier defines a plurality of interfaces between the first system of continuous voids and the second system of continuous voids.

18. The composition of matter as recited in claim 1, comprising a sealant sealing the first system of continuous voids and the second system of continuous voids along a first end of the three-dimensional matrix, wherein the sealant comprises a second material and the sealant is defined by:
 a first region comprising ligaments interspersed with voids of the first system of continuous voids and/or the second system of continuous voids, wherein the voids in the first region do not include any of the second material;
 a second region comprising ligaments interspersed with voids of the first system of continuous voids and/or the second system of continuous voids, wherein the voids in the second region are partially filled with the second material; and
 a third region comprising ligaments having former voids of the first system of continuous voids and/or the second system of continuous voids, wherein the former voids in the third region are filled with the second material.

19. A method for forming the composition of matter of claim 1, the method comprising:
 dealloying an alloy to form a matrix of ligaments interspersed with a first system of continuous voids;
 sealing at least one end of the matrix;
 forming a conformal layer of a material on surfaces of the ligaments exposed to the first system of continuous voids; and
 unsealing the matrix to form the three-dimensional matrix having at least two continuous, independent pore systems.

20. The method as recited in claim 19, the alloy comprising a gold/silver alloy, and the dealloying comprising removing substantially all silver from the alloy by etching with an aqueous nitric acid solution to form the matrix of ligaments.

* * * * *